(12) United States Patent
Namgung et al.

(10) Patent No.: US 10,008,168 B2
(45) Date of Patent: Jun. 26, 2018

(54) LIQUID CRYSTAL DISPLAY HAVING INCREASED DEGREE OF FREEDOM IN DESIGN

(71) Applicant: Samsung Display Co. Ltd., Yongin (KR)

(72) Inventors: Wan Namgung, Asan-si (KR); Ik Han Oh, Cheonan-si (KR); Ho Jun Lee, Asan-si (KR); Youn Hak Jeong, Cheonan-si (KR); Seung Kyu Lee, Cheonan-si (KR); Mi Hyeon Jo, Iksan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days. days.

(21) Appl. No.: 15/097,475

(22) Filed: Apr. 13, 2016

(65) Prior Publication Data

US 2017/0059948 A1 Mar. 2, 2017

(30) Foreign Application Priority Data

Sep. 1, 2015 (KR) ........................ 10-2015-0123469

(51) Int. Cl.
*G09G 3/36* (2006.01)
*G02F 1/1362* (2006.01)
(Continued)

(52) U.S. Cl.
CPC ....... *G09G 3/3648* (2013.01); *G02F 1/13624* (2013.01); *G09G 3/2074* (2013.01);
(Continued)

(58) Field of Classification Search
CPC ............ G02F 1/133707; G09G 3/2074; G09G 3/3614
See application file for complete search history.

(56) References Cited

U.S. PATENT DOCUMENTS 7,245,332 B2 * 7/2007 Kim .................... G02F 1/13458
345/93
7,483,090 B2 * 1/2009 Shin .................. G02F 1/134336
349/138

(Continued)

FOREIGN PATENT DOCUMENTS

| KR | 1020140113035 | 9/2014 |
| KR | 1020150007841 | 1/2015 |
| KR | 1020150019131 | 2/2015 |

*Primary Examiner* — Benjamin C Lee
*Assistant Examiner* — Chun-Nan Lin
(74) *Attorney, Agent, or Firm* — Cantor Colburn LLP

(57) ABSTRACT

A liquid crystal display includes a pixel electrode which includes a first subpixel electrode and a second subpixel electrode, a first insulating substrate and a second insulating substrate which faces the first insulating substrate, a common electrode which overlaps the pixel region, where the first subpixel electrode includes a first main unit electrode and a first sub unit electrode which is electrically connected to the first main unit electrode and smaller in area than the first main unit electrode, the second subpixel electrode includes a second main unit electrode, and a first opening part which overlaps the first main unit electrode, a second opening part which overlaps the second main unit electrode, and a third opening part which overlaps the first sub unit electrode and has a different shape from those of the first opening part and the second opening part are defined in the common electrode.

11 Claims, 13 Drawing Sheets

(51) Int. Cl.
*G09G 3/20* (2006.01)
*G02F 1/1343* (2006.01)
*G02F 1/1337* (2006.01)

(52) U.S. Cl.
CPC ..... *G09G 3/3614* (2013.01); *G02F 1/133707* (2013.01); *G02F 2001/134318* (2013.01); *G02F 2001/134345* (2013.01)

(56) References Cited

U.S. PATENT DOCUMENTS

| | | | | |
|---|---|---|---|---|
| 7,750,986 B2* | 7/2010 | Chung | .............. | G02F 1/133707 349/38 |
| 8,368,826 B2* | 2/2013 | Kim | .................... | G02F 1/1362 349/144 |
| 8,432,344 B2* | 4/2013 | Yeom | .................. | G09G 3/3648 345/695 |
| 8,610,653 B2* | 12/2013 | Tashiro | ............. | G02F 1/133707 345/87 |
| 8,675,157 B2* | 3/2014 | Lee | .................. | G02F 1/134336 349/106 |
| 9,625,780 B2* | 4/2017 | Lee | .................. | G02F 1/136286 |
| 2003/0206262 A1* | 11/2003 | Kim | .................. | G02F 1/133707 349/129 |
| 2004/0135147 A1* | 7/2004 | Kim | .................. | G02F 1/134336 257/59 |
| 2005/0094078 A1* | 5/2005 | Kang | ................ | G02F 1/134363 349/141 |
| 2005/0243259 A1* | 11/2005 | Song | ................ | G02F 1/133707 349/143 |
| 2011/0037689 A1* | 2/2011 | Tsubata | ............. | G02F 1/134336 345/103 |
| 2011/0205200 A1* | 8/2011 | Tsubata | ............. | G02F 1/136213 345/206 |
| 2012/0001839 A1* | 1/2012 | Tsubata | ............. | G02F 1/134309 345/90 |
| 2016/0062203 A1* | 3/2016 | Ono | .................. | G02F 1/134363 349/43 |
| 2016/0098964 A1* | 4/2016 | Kim | .................... | G09G 3/3648 345/694 |
| 2016/0246089 A1* | 8/2016 | Jeong | ................. | G02F 1/134309 |
| 2016/0377933 A1* | 12/2016 | Oh | .................... | G02F 1/133528 349/96 |

* cited by examiner

LIQUID CRYSTAL DISPLAY HAVING INCREASED DEGREE OF FREEDOM IN DESIGN

This application claims priority to Korean Patent Application No. 10-2015-0123469, filed on Sep. 1, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD").

2. Description of the Related Art

A liquid crystal display ("LCD") is one of the most widely used types of flat panel displays. Generally, an LCD includes a pair of display substrates having field generating electrodes, such as pixel electrodes and a common electrode, and a liquid crystal layer interposed between the two display substrates. In an LCD, voltages are applied to field generating electrodes to generate an electric field in a liquid crystal layer. Accordingly, the alignment of liquid crystal molecules of the liquid crystal layer is determined, and polarization of incident light is controlled. As a result, a desired image is displayed on the LCD.

Of the various types of LCDs, vertically aligned ("VA") mode LCDs, in which long axes of liquid crystal molecules are aligned perpendicular to display substrates when no electric field is applied, are drawing a lot of attention due to their high contrast ratio and wide reference viewing angle.

To make lateral visibility of a VA mode LCD close to that of front visibility, one pixel may be divided into two subpixels, and the two subpixels may be made to have different voltages by reducing the voltage of any one of the two subpixels. Accordingly, the two subpixels may have different transmittances.

SUMMARY

When one pixel is divided into two subpixels and when the two subpixels are made to have different voltages by reducing the voltage of any one of the two subpixels, lateral luminance may be higher than front luminance at low gray levels. Therefore, it may be difficult to accurately express gray levels in a low gray-level region. In addition, the overall luminance may be low compared with an applied pixel voltage, resulting in a reduction in driving efficiency.

Further, a liquid crystal display ("LCD") may include a pixel electrode having a certain pattern, and the visibility or aperture ratio of the LCD may be greatly affected by the design or placement of the pixel electrode. Therefore, as a higher degree of freedom in the design of the pixel electrode is ensured, an LCD with higher performance can be manufactured. In this regard, a high degree of freedom in the design of the pixel electrode is required.

Exemplary embodiments of the invention provide an LCD having improved visibility and transmittance and increased degree of freedom in design.

However, exemplary embodiments of the invention are not restricted to the one set forth herein. The above and other exemplary embodiments of the invention will become more apparent to one of ordinary skill in the art to which the invention pertains by referencing the detailed description of the invention given below.

According to an exemplary embodiment of the invention, there is provided an LCD. The LCD includes a pixel electrode which is located in one pixel region and includes a first subpixel electrode and a second subpixel electrode, a first insulating substrate and a second insulating substrate which faces the first insulating substrate, a common electrode which faces the pixel region and overlaps the pixel region, and a liquid crystal layer which is located between the pixel electrode and the common electrode, where the first subpixel electrode includes a first main unit electrode and a first sub unit electrode which is electrically connected to the first main unit electrode and smaller in area than the first main unit electrode, the second subpixel electrode includes a second main unit electrode, and a first opening part which overlaps the first main unit electrode, a second opening part which overlaps the second main unit electrode, and a third opening part which overlaps the first sub unit electrode and has a different shape from those of the first opening part and the second opening part are defined in the common electrode.

According to another exemplary embodiment of the invention, there is provided an LCD. The LCD includes a first substrate, a gate line which is located on the first substrate and extends in a first direction, a data line which is located on the first substrate, extends in a second direction intersecting the first direction, and is insulated from the gate line, a reference voltage line which is located on the first substrate, a pixel electrode which is located in one pixel region and includes a first subpixel electrode and a second subpixel electrode, a first switching device which is connected to the gate line, the data line and the first subpixel electrode, a second switching device which is connected to the gate line, the data line and the second subpixel electrode, a third switching device which is connected to the gate line, the reference voltage line and the second subpixel electrode, a second substrate which faces the first substrate, a common electrode which is located on a surface of the second substrate which faces the first substrate, and a liquid crystal layer which is located between the pixel electrode and the common electrode, where the first subpixel electrode includes a first main unit electrode and a first sub unit electrode which is electrically connected to the first main unit electrode and smaller in area than the first main unit electrode, the second subpixel electrode includes a second main unit electrode, and a first opening part which overlaps the first main unit electrode, a second opening part which overlaps the second main unit electrode, and a third opening part which overlaps the first sub unit electrode and has a different shape from those of the first opening part and the second opening part are defined in the common electrode.

Specific features of the exemplary embodiments are included in the detailed description and drawings.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
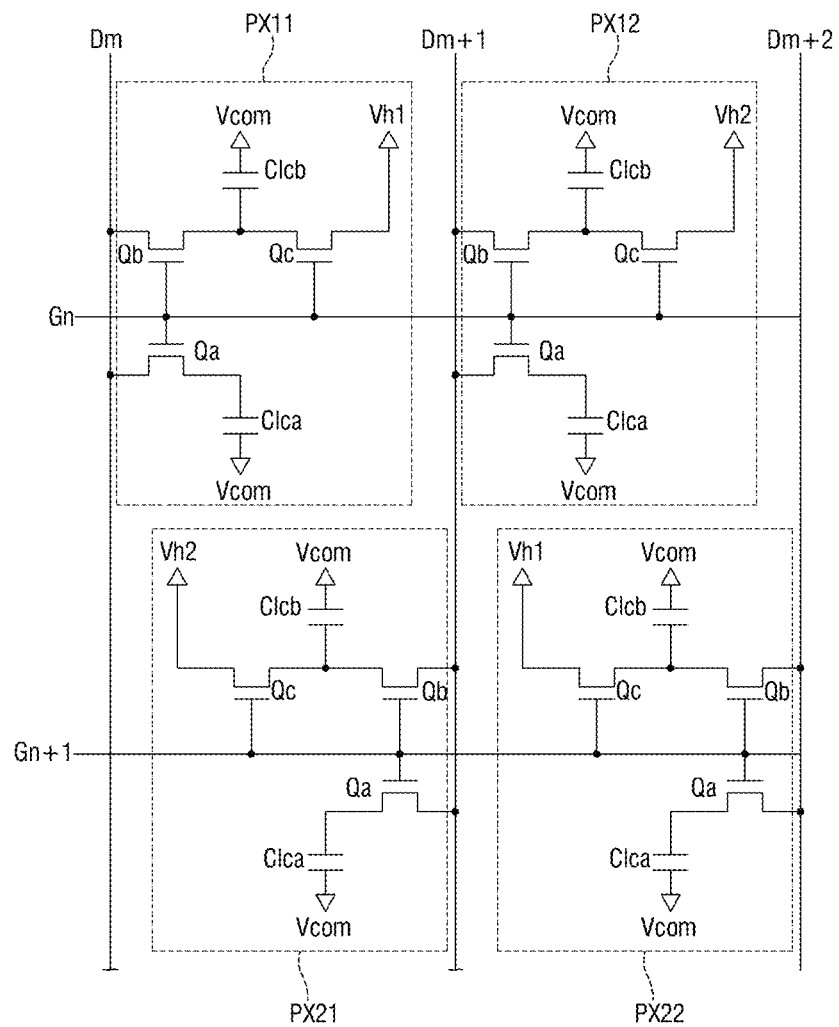
FIG. 1 is an equivalent circuit diagram of an exemplary embodiment of adjacent pixels of a liquid crystal display ("LCD") according to the invention.

Features of the invention and methods of accomplishing the same may be understood more readily by reference to the following detailed description of embodiments and the accompanying drawings. The invention may, however, be embodied in many different forms and should not be construed as being limited to the exemplary embodiments set forth herein. Rather, these embodiments are provided so that this invention will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the application belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, exemplary embodiments of the preset invention will be described with reference to the attached drawings.

FIG. 1 is an equivalent circuit diagram of adjacent pixels of a liquid crystal display ("LCD") according to an exemplary embodiment of the invention. More specifically, FIG. 1 is an equivalent circuit diagram of four pixels of an LCD according to an exemplary embodiment of the invention.

Referring to FIG. 1, the LCD according to the illustrated exemplary embodiment includes a first pixel PX11 and a second pixel PX12 which neighbor each other in a pixel row direction, a third pixel PX21 which neighbors the first pixel PX11 in a pixel column direction, a fourth pixel PX22 which neighbors the second pixel PX12 in the pixel column direction, and a plurality of signal lines Gn, Gn+1, Dm, Dm+1 and Dm+2.

The signal lines Gn, Gn+1, Dm, Dm+1 and Dm+2 include a plurality of gate lines Gn and Gn+1 which deliver gate signals (also referred to as "scan signals") and a plurality of data lines Dm, Dm+1 and Dm+2 which deliver data voltages. Although not illustrated in the drawing, multiple pairs of reference voltage lines which deliver specific reference voltages Vh1 and Vh2 may be provided. The reference voltage lines may include a first reference voltage line and a second reference voltage line which deliver reference voltages of different polarities. In exemplary embodiments, the first reference voltage line and the second reference voltage line may be located in each pixel. A first reference voltage Vh1 of a certain magnitude may be applied to the first reference voltage line, and a second reference voltage Vh2 of a certain magnitude may be applied to the second reference voltage line. The first reference voltage Vh1 and the second reference voltage Vh2 have their polarities changed in each frame. In an exemplary embodiment, when a common voltage Vcom has a magnitude of approximately 7.5 volts (V), the first reference voltage Vh1 may have a value of approximately 15 V or approximately 0 V in each frame, and the second reference voltage Vh2, contrary to the first reference voltage Vh1, may have a value of approximately 0 V or approximately 15 V in each frame. The first reference voltage Vh1 and the second reference voltage Vh2 may be greater or smaller than maximum values of the data voltages.

The first pixel PX11 includes a first gate line Gn, a first data line Dm, a first switching device Qa, a second switching device Qb, a third switching device Qc, a first liquid crystal capacitor Clca, and a second liquid crystal capacitor Clcb. The first pixel PX11 may further include a first reference voltage line and a second reference voltage line.

Each of the first switching device Qa and the second switching device Qb is connected to the first gate line Gn and the first data line Dm, and the third switching device Qc is connected to the first gate line Gn, the first reference voltage line, and an output terminal of the second switching device Qb.

Each of the first switching device Qa and the second switching device Qb is a three-terminal device such as a thin-film transistor ("TFT"). Each of the first switching device Qa and the second switching device Qb has a control terminal connected to the first gate line Gn and an input terminal connected to the first data line Dm. In addition, an output terminal of the second switching device Qb is connected to the second liquid crystal capacitor Clcb and an output terminal of the third switching device Qc, and the output terminal of the first switching device Qa is connected to the first liquid crystal capacitor Clca.

The third switching device Qc is also a three-terminal device such as a TFT. The third switching device Qc has a control terminal connected to the first gate line Gn, an input terminal connected to the first reference voltage line to receive the first reference voltage Vh1, and the output terminal connected to the second liquid crystal capacitor Clcb. The second pixel PX12 includes the first gate line Gn, a second data line Dm+1, a first switching device Qa, a second switching device Qb, a third switching device Qc, a first liquid crystal capacitor Clca, and a second liquid crystal capacitor Clcb. The second pixel PX12 may further include a first reference voltage line and a second reference voltage line.

Each of the first switching device Qa and the second switching device Qb of the second pixel PX12 has a control terminal connected to the first gate line Gn and an input terminal connected to the second data line Dm+1. An output terminal of the second switching device Qb of the second pixel PX12 is connected to the second liquid crystal capacitor Clcb and an output terminal of the third switching device Qc, and an output terminal of the first switching device Qa of the second pixel PX12 is connected to the first liquid crystal capacitor Clca.

The third switching device Qc of the second pixel PX12 has a control terminal connected to the first gate line Gn, an input terminal connected to the second reference voltage line to which the second reference voltage Vh2 is applied, and the output terminal connected to the second liquid crystal capacitor Clcb.

The third pixel PX21 includes a second gate line Gn+1, the second data line Dm+1, a first switching device Qa, a second switching device Qb, a third switching device Qc, a first liquid crystal capacitor Clca, and a second liquid crystal capacitor Clcb. The third pixel PX21 may further include a first reference voltage line and a second reference voltage line.

Each of the first switching device Qa and the second switching device Qb of the third pixel PX21 has a control terminal connected to the second gate line Gn+1 and an input terminal connected to the second data line Dm+1. An output terminal of the second switching device Qb of the third pixel PX21 is connected to the second liquid crystal capacitor Clcb and an output terminal of the third switching device Qc, and an output terminal of the first switching device Qa of the third pixel PX21 is connected to the first liquid crystal capacitor Clca.

The third switching device Qc of the third pixel PX21 has a control terminal connected to the second gate line Gn+1, an input terminal connected to the second reference voltage line to which the second reference voltage Vh2 is applied, and the output terminal connected to the second liquid crystal capacitor Clcb.

The fourth pixel PX22 includes the second gate line Gn+1, a third data line Dm+2, a first switching device Qa, a second switching device Qb, a third switching device Qc, a first liquid crystal capacitor Clca, and a second liquid crystal capacitor Clcb. The fourth pixel PX22 may further include a first reference voltage line and a second reference voltage line.

Each of the first switching device Qa and the second switching device Qb of the fourth pixel PX22 has a control terminal connected to the second gate line Gn+1 and an input terminal connected to the third data line Dm+2.

An output terminal of the second switching device Qb of the fourth pixel PX22 is connected to the second liquid crystal capacitor Clcb and an output terminal of the third switching device Qc, and an output terminal of the first switching device Qa of the fourth pixel PX22 is connected to the first liquid crystal capacitor Clca.

The third switching device Qc of the fourth pixel PX22 has a control terminal connected to the second gate line Gn+1, an input terminal connected to the first reference voltage line to which the first reference voltage Vh1 is applied, and the output terminal connected to the second liquid crystal capacitor Clcb.

When a gate-on signal is transmitted to the first gate line Gn, the first through third switching devices Qa through Qc of the first and second pixels PX11 and PX12 which are connected to the first gate line Gn are turned on. Accordingly, a data voltage applied to the first data line Dm is provided to one terminal of each of the first and second liquid crystal capacitors Clca and Clcb of the first pixel PX11 through the turned-on first and second switching devices Qa and Qb of the first pixel PX11. In addition, a data voltage applied to the second data line Dm+1 is provided to one terminal of each of the first and second liquid crystal capacitors Clca and Clcb of the second pixel PX12 through the turned-on first and second switching devices Qa and Qb of the second pixel PX12. Here, the first liquid crystal capacitor Clca and the second liquid crystal capacitor Clcb of the first pixel PX12 are charged with the same voltage, and the first liquid crystal capacitor Clca and the second liquid crystal capacitor Clcb of the second pixel PX12 are charged with the same voltage.

At the same time, one terminal of the second liquid crystal capacitor Clcb of the first pixel PX11 is connected to the output terminal of the third switching device Qc and thus stepped up by the first reference voltage Vh1 applied through the input terminal of the third switching device Qc. Here, the first reference voltage Vh1 may have the same polarity as the data voltage applied to the first data line Dm and may be greater in magnitude than the data voltage applied to the first data line Dm. Therefore, as the first reference voltage Vh1 applied through the third switching device Qc is divided, the voltage charged in the second liquid crystal capacitor Clcb may have a higher value than the data voltage applied through the first data line Dm.

In addition, one terminal of the second liquid crystal capacitor Clcb of the second pixel PX12 is connected to the output terminal of the third switching device Qc and thus stepped up by the second reference voltage Vh2 applied through the third switching device Qc. Here, the second reference voltage Vh2 applied through the second reference voltage line may have the same polarity as the data voltage applied to the second data line Dm+1 and may have a greater value than the data voltage applied to the second data line Dm+1. Therefore, as the second reference voltage Vh2 applied through the third switching device Qc is divided, the voltage charged in the second liquid crystal capacitor Clcb of the second pixel PX12 may have a higher value than the data voltage applied to the second data line Dm+1.

When a gate voltage of the first gate line Gn is changed to a gate-off voltage and a gate voltage of the second gate line Gn+1 is changed to a gate-on voltage, the first through third switching devices Qa through Qc of the third and fourth pixels PX21 and PX22 which are connected to the second gate line Gn+1 are turned on. Accordingly, a data voltage applied to the second data line Dm+1 is provided to one terminal of each of the first and second liquid crystal capacitors Clca and Clcb of the third pixel PX21 through the turned-on first and second switching devices Qa and Qb of the third pixel PX21, and a data voltage applied to the third data line Dm+2 is provided to one terminal of the first and second liquid crystal capacitors Clca and Clcb of the fourth pixel PX22 through the turned-on first and second switching devices Qa and Qb of the fourth pixel PX22.

Here, the first liquid crystal capacitor Clca and the second liquid crystal capacitor Clcb of the third pixel PX21 are charged with the same voltage, and the first liquid crystal capacitor Clca and the second liquid crystal capacitor Clcb of the fourth pixel PX22 are charged with the same voltage. At the same time, one terminal of the second liquid crystal capacitor Clcb of the third pixel PX21 is connected to the output terminal of the third switching device Qc and thus stepped up by the second reference voltage Vh2 applied through the input terminal of the third switching device Qc. Here, the second reference voltage Vh2 applied to the second reference voltage line may have the same polarity as the data voltage applied to the second data line Dm+1 and have a higher value than the data voltage applied to the second data line Dm+1. Therefore, as the second reference voltage Vh2 applied through the third switching device Qc is divided, the voltage charged in the second liquid crystal capacitor Clcb of the third pixel PX21 may have a higher value than the data voltage applied through the second data line Dm+1.

In addition, one terminal of the second liquid crystal capacitor Clcb of the fourth pixel PX22 is connected to the output terminal of the third switching device Qc and thus stepped up by the first reference voltage Vh1 applied through the third switching device Qc. Here, the first reference voltage Vh1 applied to the first reference voltage line may have the same polarity as a data voltage applied to the third data line Dm+2 and have a higher value than the data voltage applied to the third data line Dm+2. Therefore, as the first reference voltage Vh1 applied through the third switching device Qc is divided, the voltage charged in the second liquid crystal capacitor Clcb of the fourth pixel PX22 may be greater in magnitude than the data voltage applied through the third data line Dm+2.

The voltage charged in the first liquid crystal capacitor Clca and the voltage charged in the second liquid crystal capacitor Clcb may become different. Since the voltage charged in the first liquid crystal capacitor Clca and the voltage charged in the second liquid crystal capacitor Clcb are different, liquid crystal molecules tilt at different angles in a first subpixel and a second subpixel, thus causing the two subpixels to have different luminance levels. Therefore, an image viewed from the side may be made as close to an image viewed from the front as possible by appropriately adjusting the voltage charged in the first liquid crystal capacitor Clca and the voltage charged in the second liquid crystal capacitor Clcb. Accordingly, this may improve lateral visibility.

Figure 2:
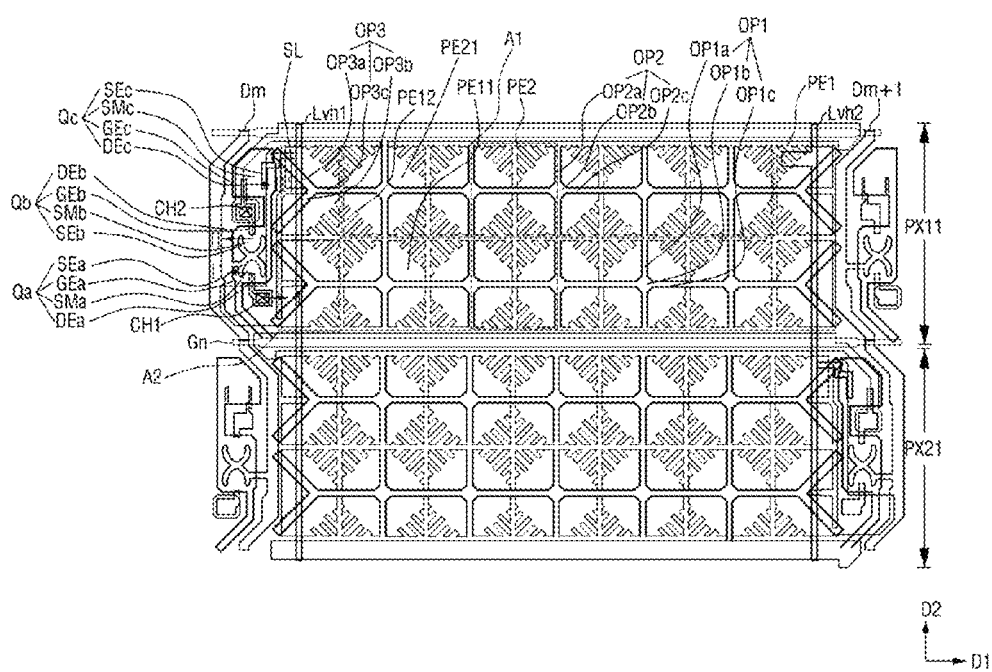
FIG. 2 is a plan view of an LCD according to an exemplary embodiment of the invention.
Figure 3:
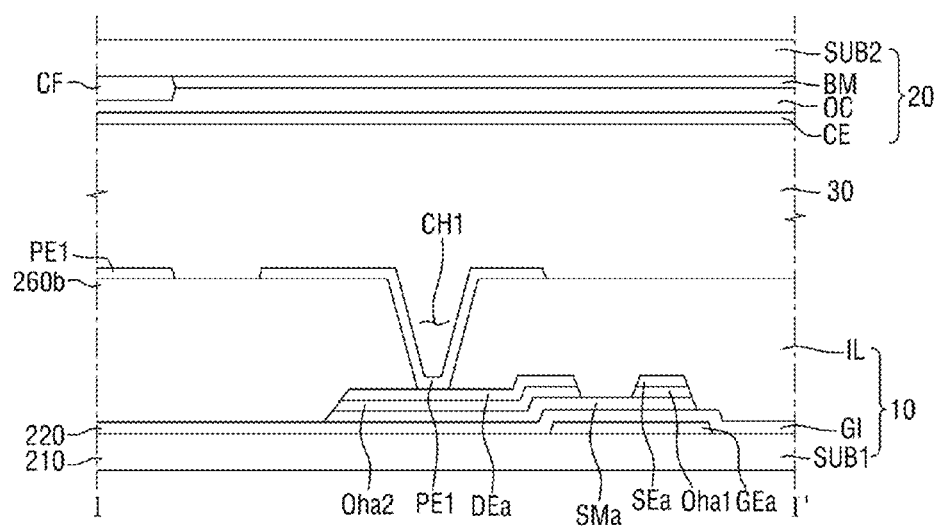
FIG. 3 is a cross-sectional view of the LCD, taken along line I-I' of FIG. 2.
Figure 4:
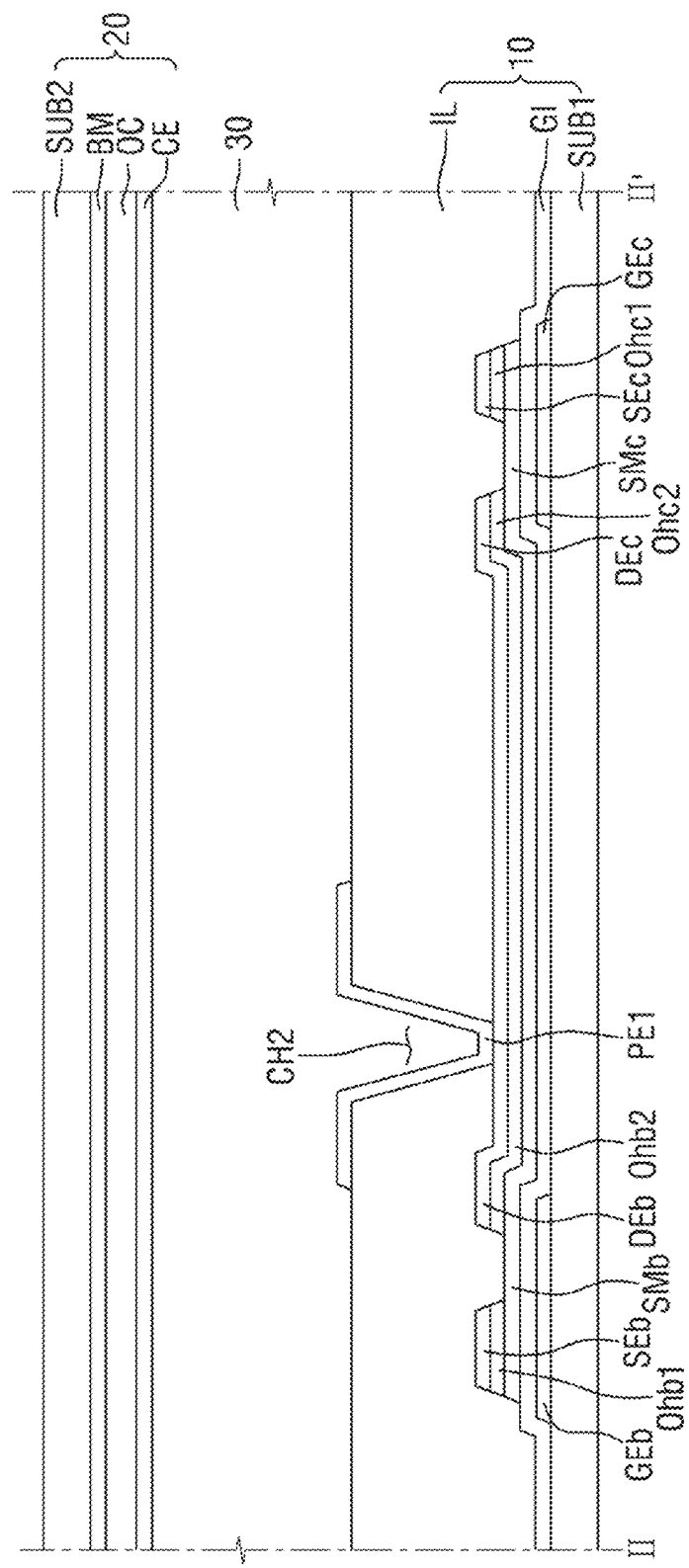
FIG. 4 is a cross-sectional view of the LCD, taken along line II-IF of FIG. 2.
Figure 5:
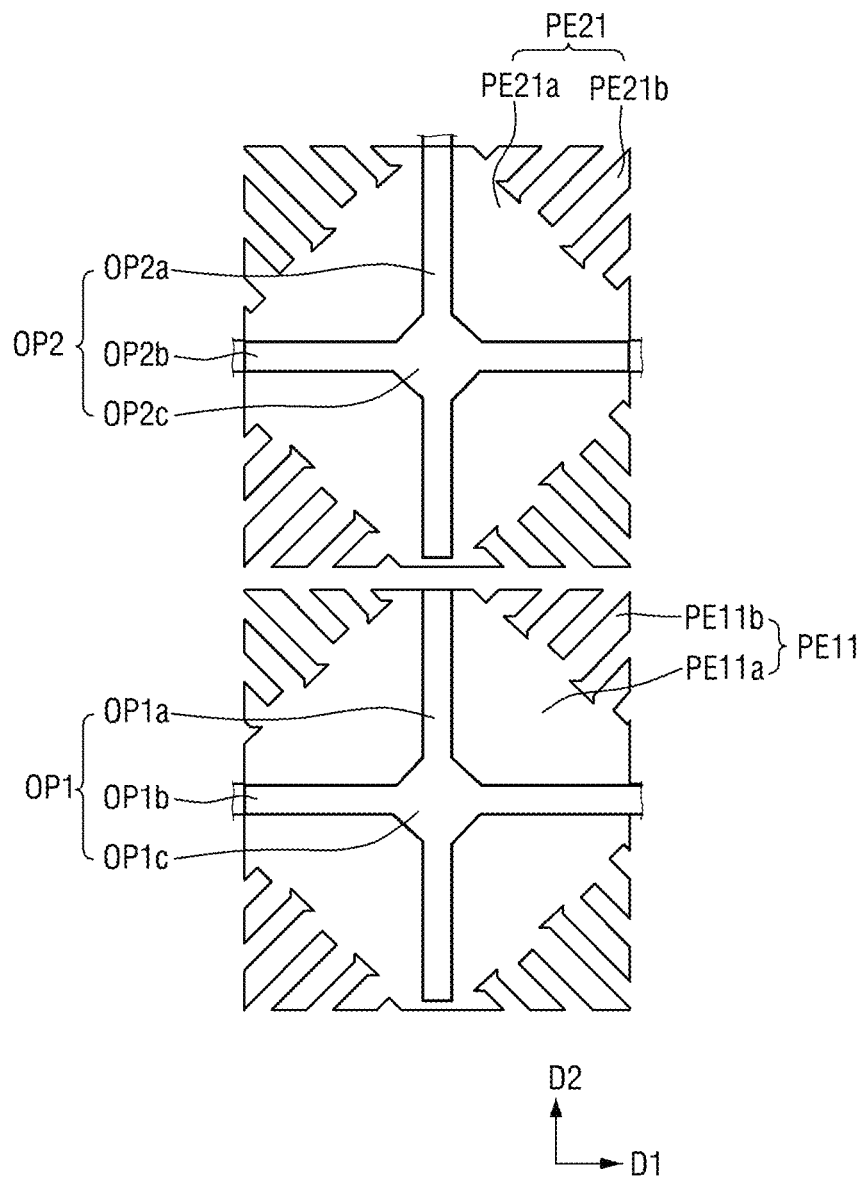
FIG. 5 is an enlarged view of a portion 'A1' of FIG. 2.
Figure 6:
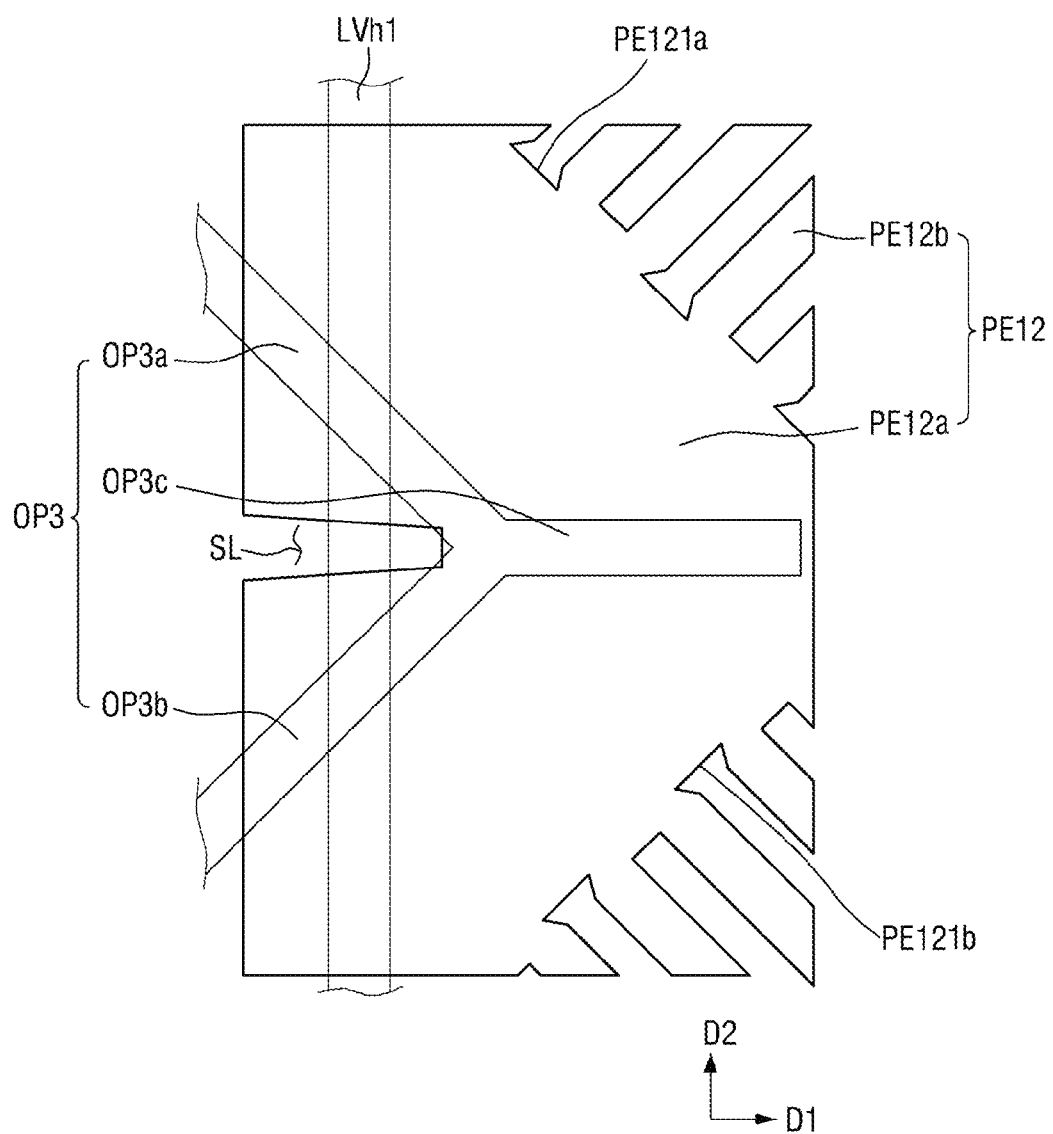
FIG. 6 is an enlarged view of a portion 'A2' of FIG. 2.
Figure 7:
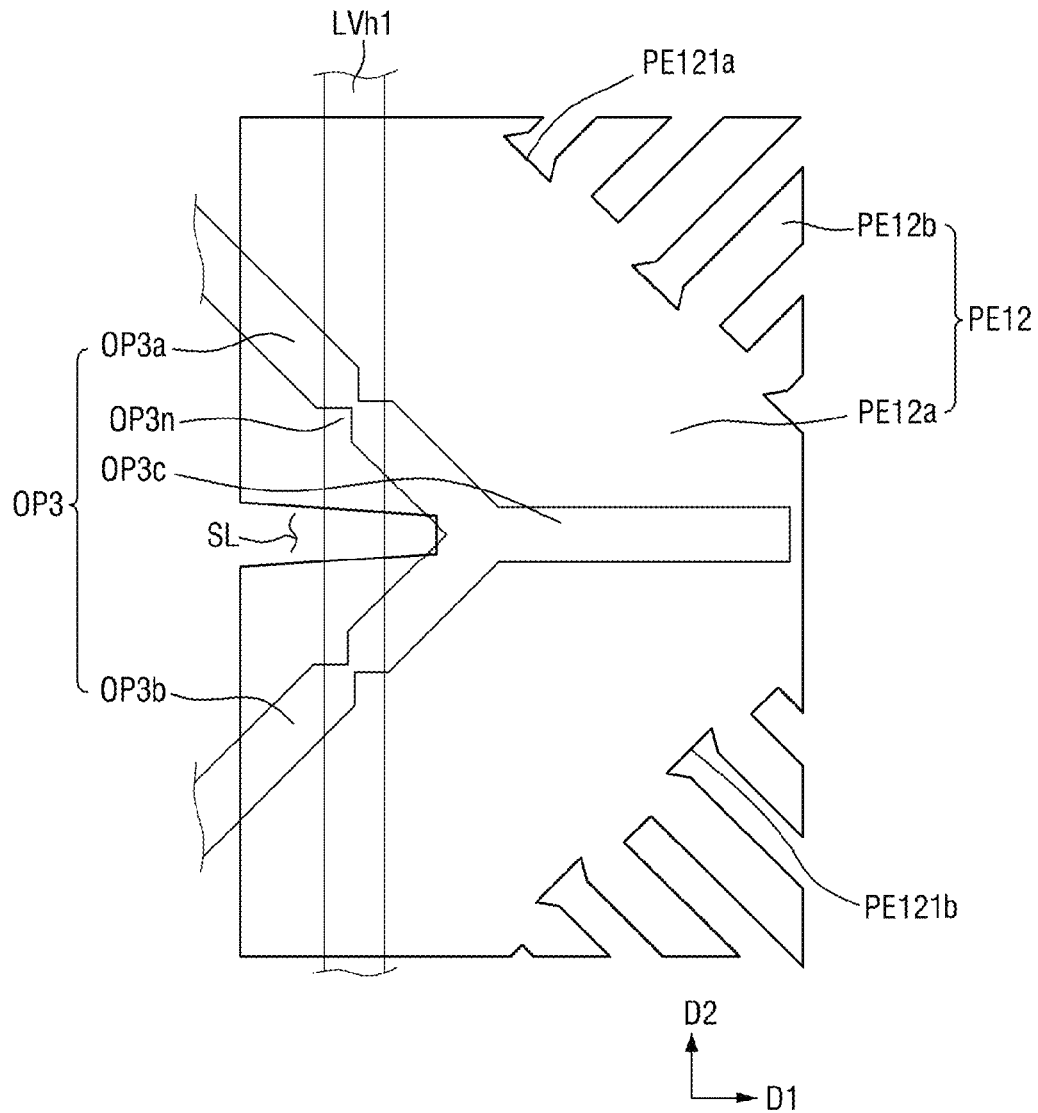
FIG. 7 is a modified embodiment of a structure illustrated in FIG. 6.

FIG. 2 is a plan view of an LCD according to an exemplary embodiment of the invention. More specifically, FIG. 2 is a plan view of the first pixel PX11 and the third pixel PX21 from among a plurality of pixels included in the LCD of FIG. 1. FIG. 3 is a cross-sectional view of the LCD, taken along line I-I' of FIG. 2. FIG. 4 is a cross-sectional view of the LCD, taken along line II-II of FIG. 2. FIG. 5 is an enlarged view of a portion 'A1' of FIG. 2. FIG. 6 is an enlarged view of a portion 'A2' of FIG. 2. FIG. 7 is a modified embodiment of a structure illustrated in FIG. 6.

Referring to FIGS. 2 through 7, the LCD according to the illustrated exemplary embodiment may include an array substrate 10, a counter substrate 20 which faces the array substrate 10, and a liquid crystal layer 30 which is located between the array substrate 10 and the counter substrate 20. The LCD according to the illustrated exemplary embodiment may further include a pair of polarizers (not illustrated) attached to outer surfaces of the array substrate 10 and the counter substrate 20.

The first pixel PX11 and the third pixel PX21 of the LCD according to the illustrated exemplary embodiment may have substantially the same structure. Therefore, the structure of the LCD according to the illustrated exemplary embodiment will hereinafter be described based on the first pixel PX11, and a detailed description of the third pixel PX21 will be omitted.

First, the array substrate 10 will be described.

A first insulating substrate SUB1 may be a transparent insulating substrate. In an exemplary embodiment, the first insulating substrate SUB1 may be a glass substrate, a quartz substrate, a transparent resin substrate, etc. In addition, the first insulating substrate SUB1 may include a polymer or plastic with high thermal resistance. In exemplary embodiments, the first insulating substrate SUB1 may also have flexibility. That is, the first insulating substrate SUB1 may be a deformable substrate that may be rolled, folded, bent, etc.

The first insulating substrate SUB1 may include a pixel region in which one pixel is located. The pixel region may be defined by the intersection of a first gate line Gn and a first data line Dm which will be described later or may be defined as a region in which a pixel electrode PE1 or PE2 is located.

The first gate line Gn may be located on the first insulating substrate SUB1. The first gate line Gn extends substantially in a first direction D1 and delivers a gate signal.

A first gate electrode GEa, a second gate electrode GEb, and a third gate electrode GEc may be located on the first insulating substrate SUB1. The first through third gate electrodes GEa through GEc may protrude from the first gate line Gn and may be connected to each other. The first through third gate electrodes GEa through GEc may all be connected to the first gate line Gn and receive the same gate signal.

In an exemplary embodiment, the first gate line Gn, the first gate electrode GEa, the second gate electrode GEb and the third gate electrode GEc may include aluminum (Al)-based metal such as aluminum or an aluminum alloy, silver (Ag)-based metal such as silver or a silver alloy, copper (Cu)-based metal such as copper or a copper alloy, molybdenum (Mo)-based metal such as molybdenum or a molybdenum alloy, chrome (Cr), titanium (Ti), or tantalum (Ta). Each of the first gate line Gn, the first gate electrode GEa, the second gate electrode GEb and the third gate electrode GEc may have a single layer structure or a multilayer structure including at least two conductive layers with different physical characteristics.

A gate insulating layer GI may be located on the first gate line Gn and the first through third gate electrodes GEa through GEc. In an exemplary embodiment, the gate insulating layer GI may include an inorganic insulating material such as silicon oxide, silicon nitride, or silicon oxynitride. The gate insulating layer GI may have a single layer structure or a multilayer structure including at least two insulating layers with different physical characteristics.

A first semiconductor layer SMa, a second semiconductor layer SMb, and a third semiconductor layer SMc are disposed on the gate insulating layer GI. The first semiconductor layer SMa may overlap the first gate electrode GEa, the second semiconductor layer SMb may overlap the second gate electrode GEb, and the third semiconductor layer SMc may overlap the third gate electrode GEc. The first semiconductor layer SMa, the second semiconductor layer SMb, and the third semiconductor layer SMc may include silver, amorphous silicon, polycrystalline silicon, or an oxide semiconductor.

A plurality of ohmic contact members Oha1, Oha2, Ohb1, Ohb2, Ohc1 and Ohc2 may be located on the first semiconductor layer SMa, the second semiconductor layer SMb, and the third semiconductor layer SMc. The ohmic contact members Oha1, Oha2, Ohb1, Ohb2, Ohc1 and Ohc2 may include source ohmic contact members Oha1, Ohb1 and Ohc1 located under first through third source electrodes SEa through SEc which will be described later and drain ohmic contact members Oha2, Ohb2 and Ohc2 located under first through third drain electrodes DEa through DEc which will be described later. In exemplary embodiments, the ohmic contact members Oha1, Oha2, Ohb1, Ohb2, Ohc1 and Ohc2 may include n+ hydrogenated amorphous silicon heavily doped with n-type impurities or may include silicide. In exemplary embodiments, when the first semiconductor layer SMa, the second semiconductor layer SMb, the third semiconductor layer SMc are oxide semiconductors, the ohmic contact members Oha1, Oha2, Ohb1, Ohb2, Ohc1 and Ohc2 may be omitted.

The first data line Dm, a second data line Dm+1, the first source electrode SEa, the first drain electrode DEa, the second source electrode SEb, the second drain electrode DEb, the third source electrode SEc, and the third drain electrode DEc are disposed on the ohmic contact members Oha1, Oha2, Ohb1, Ohb2, Ohc1 and Ohc2 and the gate insulating layer GI.

The first data line Dm and the second data line Dm+1 deliver data voltages and extend substantially in a second direction D2 to intersect the first gate line Gn.

The first source electrode SEa protrudes from the first data line Dm onto the first gate electrode GEa. In exemplary embodiments, the first source electrode SEa may be disposed on the first gate electrode GEa in a 'C' shape, but the invention is not limited thereto.

The first drain electrode DEa is disposed on the first gate electrode GEa to be separated from the first source electrode SEa. A channel is defined in a part of the first semiconductor layer SMa which is exposed between the first source electrode SEa and the first drain electrode DEa separated from each other.

The second source electrode SEb protrudes from the first data line Dm onto the second gate electrode GEb. The second source electrode SEb may be physically and electrically connected to the first source electrode SEa. In addition, the second source electrode SEb may be disposed on the second gate electrode GEb in a 'C' shape.

The second drain electrode DEb is disposed on the second gate electrode GEb to be separated from the second source electrode SEb. A channel is defined in a part of the second semiconductor layer SEb which is exposed between the second source electrode SEb and the second drain electrode DEb separated from each other. The second drain electrode DEb may include a wide extended part.

The third drain electrode DEc is connected to the second drain electrode DEb and disposed on the third gate electrode GEc to be separated from the third source electrode SEc. A channel is defined in a part of the third semiconductor layer SMc which is exposed between the third source electrode SEc and the third drain electrode DEc separated from each other.

The third source electrode SEc protrudes from a first reference voltage line LVh1, which will be described later, onto the third gate electrode GEc. The third source electrode SEc is connected to the first reference voltage line LVh1 so as to receive a certain voltage, for example, a first reference voltage Vh1 (refer to FIG. 1).

In an exemplary embodiment, the first and second data lines Dm and Dm+1, the first source electrode SEa, the first drain electrode DEa, the second source electrode SEb, the second drain electrode DEb, the third source electrode SEc and the third drain electrode DEc may include aluminum, copper, silver, molybdenum, chrome, titanium, tantalum, or an alloy of these metals. In addition, each of the first and second data lines Dm and Dm+1, the first source electrode SEa, the first drain electrode DEa, the second source electrode SEb, the second drain electrode DEb, the third source electrode SEc and the third drain electrode DEc may have, but not limited to, a multilayer structure including a lower layer (not illustrated) including refractory metal, for example, and an upper layer (not illustrated) with low resistivity.

The first gate electrode GEa, the first semiconductor layer SMa, the first source electrode SEa, and the first drain electrode DEa may provide a first switching device Qa. In addition, the second gate electrode GEb, the second semiconductor layer SMb, the second source electrode SEb, and the second drain electrode DEb may provide a second switching device Qb. The third gate electrode GEc, the third semiconductor layer SMc, the third source electrode SEc, and the third drain electrode DEc may provide a third switching device Qc.

The first reference voltage line LVh1 and a second reference voltage line LVh2 may extend side by side with the first data line Dm and the second data line Dm+1, and may be located between the first data line Dm and the second data line Dm+1 when seen from a plan view.

In exemplary embodiments, the first reference voltage line LVh1 and the second reference voltage line LVh2 may include the same material as the first data line Dm and the second data line Dm+1 and may be located on the same layer as the first data line Dm and the second data line Dm+1.

A passivation layer IL may be located on the first and second data lines Dm and Dm+1, the first source electrode SEa, the first drain electrode DEa, the second source electrode SEb, the second drain electrode DEb, the third source electrode SEc, the third drain electrode DEc, the first reference voltage line LVh1, and the second reference voltage line LVh2. The passivation layer IL may include an inorganic insulating material or an organic insulating material.

A first contact hole CH1 which partially exposes the first drain electrode DEa and a second contact hole CH2 which partially exposes the second drain electrode DEb are defined in the passivation layer IL.

The pixel electrodes PE1 and PE2 may be located on the passivation layer IL. In an exemplary embodiment, the pixel electrodes PE1 and PE2 may include a transparent conductive material. In an exemplary embodiment, the pixel electrodes PE1 and PE2 may include a transparent conductive material such as indium tin oxide ("ITO"), indium zinc oxide ("IZO"), or indium tin zinc oxide ("ITZO").

The pixel electrodes PE1 and PE2 included in the LCD according to the illustrated exemplary embodiment may be wider in the first direction D1 than in the second direction D2. In an exemplary embodiment, in FIG. 2, the pixel electrodes PE1 and PE2 may be wider in a horizontal direction than in a vertical direction. However, the invention is not limited thereto. In another exemplary embodiment, the pixel electrodes PE1 and PE2 may be narrower in the first direction D1 than in the second direction D2.

The pixel electrodes PE1 and PE2 may be located in the pixel region defined by the first gate line Gn and the first data line Dm. In an exemplary embodiment, it will be recognized by those skilled in the art that the pixel electrodes PE 1 and PE 2 may be a first subpixel electrode PE1 and a second subpixel electrode PE2, respectively, which are physically separated from each other.

In the illustrated exemplary embodiment, both the first subpixel electrode PE1 and the second subpixel electrode PE2 may be located above the first gate line Gn in the drawings. However, the invention is not limited thereto. In another exemplary embodiment, when the pixel electrodes PE1 and PE2 are narrower in the first direction D1 than in the second direction D2, the first subpixel electrode PE1 may be located below the first gate line Gn, and the second subpixel electrode PE2 may be located above the first gate line Gn. That is, in another exemplary embodiment, the first gate line Gn may be located between the first subpixel electrode PE1 and the second subpixel electrode PE2.

The area of the first subpixel electrode PE1 may be greater than that of the second subpixel electrode PE2. In exemplary embodiments, an area ratio of the first subpixel electrode PE1 and the second subpixel electrode PE2 may be constant in order to improve visibility. In an exemplary embodiment, the area ratio of the first subpixel electrode PE1 and the second subpixel electrode PE2 may be 1.4:1, for example.

The first subpixel electrode PE1 may be located relatively closer to the first data line Dm than the second subpixel electrode PE2.

Apart of the first subpixel electrode PE1 may extend toward the first switching device Qa and thus be physically and electrically connected to the first drain electrode DEa of the first switching device Qa through the first contact hole CH1.

In addition, a part of the second subpixel electrode PE2 may extend toward the second switching device Qb and thus be physically and electrically connected to the second drain electrode DEb of the second switching device Qb through the second contact hole CH2. In exemplary embodiments, the extended part of the second subpixel electrode PE2 which is connected to the second drain electrode DEb may overlap a gate line of a pixel located above the first pixel P11 in a column direction (or the second direction D2), as illustrated in FIG. 2.

The first subpixel electrode PE1 may include a first main unit electrode PE11 and a first sub unit electrode PE12 which is smaller in area than the first main unit electrode PE11. In exemplary embodiments, the first subpixel electrode PE1 may include a plurality of first main unit electrodes PE11 and a plurality of first sub unit electrodes PE12.

The first main unit electrodes PE11 may be arranged side by side with each other along the first direction D1 and may be connected to each other.

The first sub unit electrodes PE12 may be located on an edge of the first subpixel electrode PE1. Some of the first sub unit electrodes PE12 may be connected to the first main unit electrodes PE11. In addition, the other ones of the first sub unit electrodes PE12 may be connected to the some of the first sub unit electrodes PE12 and located around the second subpixel electrode PE2. The first sub unit electrodes PE12 may overlap the first reference voltage line LVh1 or the second reference voltage line LVh2.

The second subpixel electrode PE2 may include a second main unit electrode PE21. In exemplary embodiments, the second subpixel electrode PE2 may include a plurality of second main unit electrodes PE21.

The second main unit electrodes PE21 may be arranged side by side with each other along the first direction D1 and may be connected to each other.

Referring to FIG. 5, a first main unit electrode PE11 may include a first main plate electrode PE11a shaped like a plate and a plurality of first main branch electrodes PE11b extending from the first main plate electrode PE11a. In exemplary embodiments, the first main plate electrode PE11a may be rhombic or octagonal, for example. The first main branch electrodes PE11b may extend in four different directions from the first main plate electrode PE11a. In the drawing, the first main branch electrodes PE11b may extend obliquely in an upper right direction, in a lower right direction, in an upper left direction, and in a lower left direction. The first main branch electrodes PE11b may be separated from each other by a distance of micrometers, thereby defining a plurality of fine slits.

The first main unit electrode PE11 may be vertically and horizontally symmetrical in the drawing.

Similarly, a second main unit electrode PE21 may include a second main plate electrode PE21a shaped like a plate and a plurality of second main branch electrodes PE21b extending from the second main plate electrode PE21a. In exemplary embodiments, the second main plate electrode PE21a may be rhombic or octagonal, for example. The second main branch electrodes PE21b may extend in four different directions from the second main plate electrode PE21a.

The second main unit electrode PE21 may be vertically and horizontally symmetrical in the drawing.

Liquid crystal molecules of the liquid crystal layer 30 may tilt in different directions according to the first main branch electrodes PE11b and the second main branch electrodes PE21b which extend in different directions. Therefore, four domains in which the liquid crystal molecules tilt in different directions are provided in the liquid crystal layer 30. By tilting the liquid crystal molecules in various directions as described above, a reference viewing angle of the LCD may be increased.

In exemplary embodiments, the first main unit electrodes PE11 may have substantially the same shape as that of the second main unit electrodes PE21, and the area of one first main unit electrode PE11 may be substantially equal to that of one second main unit electrode PE21. That is, the first main unit electrodes PE11 may be identical to the second main unit electrodes PE21.

Each of the first sub unit electrodes PE12 may include a first sub plate electrode PE12a shaped like a plate and a plurality of first sub branch electrodes PE12b extending from the first sub plate electrode PE12a. In exemplary embodiments, the first sub plate electrode PE12a may be smaller in area than each of the first main plate electrode PE11a and the second main plate electrode PE21a. The first sub plate electrode PE12a may be symmetrical with respect to a line extending along the first direction D1 and asymmetrical with respect to a line extending along the second direction D2. That is, each of the first sub unit electrodes PE12 may be vertically symmetrical and horizontally asymmetrical in the drawings.

In exemplary embodiments, a slit SL may be defined in the first sub plate electrode PE12a. The slit SL may extend along the first direction D1. The slit SL may extend in substantially the same direction as a third horizontal opening OP3c of a third opening part OP3 which will be described later and extend toward a boundary between a sub opening OP3a or OP3b and the horizontal opening OP3c.

The first sub branch electrodes PE12b may extend in different directions from the first sub plate electrode PE12a. In the drawings, the first sub branch electrodes PE12b extend in two different directions from the first sub plate electrode PE12a. However, this is merely an example.

A lower alignment layer (not illustrated) may be disposed on the pixel electrodes PE1 and PE2. In an exemplary embodiment, the lower alignment layer may be a vertical alignment layer or a photoalignment layer that includes a photoreactive material.

As described above, the pixel electrodes PE1 and PE2 includes not only the first main unit electrodes PE11 and the second main unit electrodes PE21 but also the first sub unit electrodes PE12 smaller in area than the first main unit electrodes PE11 and the second main unit electrodes PE21. Therefore, the area ratio of the first subpixel electrode PE1 and the second subpixel electrode PE2 may be adjusted more easily.

In addition, since the first reference voltage line LVh1 or the second reference voltage line LVh2 overlaps the first sub unit pixel electrodes PE12 having a relatively smaller area, a reduction in aperture ratio due to the first reference voltage line LVh1 or the second reference voltage line LVh2 may be reduced relatively.

The counter substrate 20 will now be described.

The counter substrate 20 may include a second insulating substrate SUB2, a light-blocking member BM, an overcoat layer OC, a plurality of color filters CF, and a common electrode CE.

Like the first insulating substrate SUB1, the second insulating substrate SUB2 may be a transparent insulating substrate. In addition, the second insulating substrate SUB2 may include a polymer or plastic with high thermal resistance. In exemplary embodiments, the second insulating substrate SUB2 may also have flexibility.

The light-blocking member BM is located on a surface of the second insulating substrate SUB2 which faces the first insulating substrate SUB1. The light-blocking member BM is also called a black matrix and prevents the leakage of light. The color filters CF are located on the second insulating substrate SUB2 and the light-blocking member BM. The overcoat layer OC is located on the color filters CF. The overcoat layer OC prevents the lifting of the color filters CF and the light-blocking member BM and suppresses the contamination of the liquid crystal layer 30 by an organic material (such as a solvent) introduced from the color filters CF. In other exemplary embodiments, the overcoat layer OC may be omitted.

In the LCD according to the illustrated exemplary embodiment, the light-blocking member BM and the color filters CF are included in the counter substrate 20. However, in an LCD according to another exemplary embodiment of the invention, the light-blocking member BM and the color filters CF may be included in the array substrate 10. In this case, the color filters CF may be included in the array substrate 10 in place of the passivation layer IL.

The common electrode CE is located on the overcoat layer OC. In an exemplary embodiment, the common electrode CE may include a transparent conductive material such as ITO, IZO, etc. In exemplary embodiments, the common electrode CE may be disposed on the whole surface of the second insulating substrate SUB2. A common voltage Vcom (refer to FIG. 1) may be applied to the common electrode CE. Accordingly, the common electrode CE may generate an electric field together with the pixel electrodes PE1 and PE2.

The first subpixel electrode PE1 and the common electrode CE provide a first liquid crystal capacitor Clca (refer to FIG. 1) together with the liquid crystal layer 30 interposed therebetween, and the second subpixel electrode PE2 and the common electrode CE provide a second liquid crystal capacitor Clcb (refer to FIG. 1) together with the liquid crystal layer 30 interposed therebetween. Due to a voltage applied to the first subpixel electrode PE1 and the second subpixel electrode PE2 and the common voltage Vcom applied to the common electrode CE, an electric field is applied to the liquid crystal layer 30. The direction of the liquid crystal molecules of the liquid crystal layer 30 is determined by the intensity of the electric field, and the luminance of light passing through the liquid crystal layer 30 varies according to the arrangement direction of the liquid crystal molecules. Consequently, the luminance of the light is determined as the light passes through the liquid crystal layer 30, and the color of the light is determined as the light passes through the color filters CF. Therefore, one pixel may display a certain color.

A first opening part OP1, a second opening part OP2, and the third opening part OP3 may be defined in the common electrode CE. In exemplary embodiments, a plurality of first opening parts OP1, a plurality of second opening parts OP2, and a plurality of third opening parts OP3 may be defined in the common electrode CE.

The first opening parts OP1 overlap the first main unit electrodes PE11, the second opening parts OP2 may overlap the second main unit electrodes PE21, and the third opening parts OP3 may overlap the first sub unit electrodes PE12. In exemplary embodiments, each of the first opening parts OP1 may overlap the first main plate electrode PE11a, each of the second opening parts OP2 may overlap the second main plate electrode PE21a, and each of the third opening parts OP3 may overlap the first sub plate electrode PE12a. The first opening parts OP1, the second opening parts OP2 and the third opening parts OP3 may improve the controllability of the liquid crystal molecules.

Each of the first opening parts OP1 is a cross-shaped opening part including a first horizontal opening OP1b which extends side by side with the first gate line Gn and a first vertical opening OP1a which extends side by side with the first data line Dm. That is, a planar shape of each of the first opening parts OP1 may be a cross shape. In exemplary embodiments, each of the first opening parts OP1 may further include a first opening pattern OP1c located at an intersection of the first horizontal opening OP1b and the first vertical opening OP1b. The first opening pattern OP1c may have a substantially rhombic planar shape. The first opening pattern OP1c additionally included in each of the first opening parts OP1 may improve liquid crystal controllability. As a result, the liquid crystal molecules may be aligned fast by an electric field, which, in turn, increases response speed.

Like the first opening parts OP1, each of the second opening parts OP2 is a cross-shaped opening part including a second horizontal opening OP2b which extends side by side with the first gate line Gn and a second vertical opening OP2a which extends side by side with the first data line Dm. That is, a planar shape of each of the second opening parts OP2 may be a cross shape. In exemplary embodiments, each of the second opening parts OP2 may further include a second opening pattern OP2c located at an intersection of the second horizontal opening OP2b and the second vertical opening OP2b. In an exemplary embodiment, the second opening pattern OP2c may have a substantially rhombic planar shape, for example.

In exemplary embodiments, the first opening parts OP1 may have substantially the same shape as that of the second opening parts OP2. The area of one first opening part OP1 may be substantially equal to that of one second opening part OP2. That is, the first opening parts OP1 may be identical to the second opening parts OP2.

A planar shape of each of the third opening parts OP3 may be different from the planar shape of each of the first opening parts OP1 and the planar shape of each of the second opening parts OP2. In exemplary embodiments, each of the third opening parts OP3 may, as illustrated in FIG. 6, include the sub openings OP3a and OP3b and the third horizontal opening OP3c which extends substantially side by side with the first gate line Gn. In an exemplary embodiment, a planar shape of the sub openings OP3a and OP3b may be a 'V' shape, and the third horizontal opening OP3c may be located at a location where a first part OP3a and a second part OP3b of the sub opening OP3a and OP3b meet, for example. In an exemplary embodiment, a planar shape of each of the third opening parts OP3 may be a 'Y' shape, for example.

In an alternative exemplary embodiment, in the modified embodiment of FIG. 7, notches OP3n may be further defined in each third opening part OP3 in the common electrode CE. The notches OP3n may be defined in a sub opening OP3a or OP3b. As illustrated in FIG. 7, the notches OP3n may protrude inwards of the sub opening OP3a and OP3b. That is, the notches OP3n may be engraved notches. However, the invention is not limited thereto. In another exemplary embodiment, the notches OP3n may also be embossed notches.

A direction in which the first part OP3a of the sub openings OP3a and OP3b extends and a direction in which the second part OP3b of the sub openings OP3a and OP3b extends may be different from the direction (or the first direction D1) in which the first gate line Gn extends and the direction (or the second direction D2) in which the first data line Dm extends. In exemplary embodiments, a direction in which the sub openings OP3a and OP3b extends may be substantially parallel to an edge adjacent to the first sub branch electrodes PE12b from among edges of the first sub plate electrode PE12a. More specifically, referring to FIGS. 2 and 6, of the edges of the first sub plate electrode PE12a, an edge adjacent to the first sub branch electrodes PE12b extending in the upper right direction may be referred to as a first edge PE121a, and an edge adjacent to the first sub branch electrodes PE12b extending in the lower right direction may be referred to as a second edge PE121b. In this case, the first part OP3a of the sub openings OP3a and OP3b may be parallel to the first edge PE121a. Similarly, the second part OP3b of the sub openings OP3a and OP3b may be parallel to the second edge PE121b. The sub openings OP3a and OP3b included in each of the third opening parts OP3 may decrease a reduction in transmittance due to an overlay variation between the common electrode CE and the pixel electrodes PE1 and PE2.

The liquid crystal layer 30 will now be described.

The liquid crystal layer 30 may include a plurality of liquid crystal molecules having dielectric anisotropy. In exemplary embodiments, the liquid crystal molecules of the liquid crystal layer 30 may have positive dielectric anisotropy, for example. When an electric field is applied to be between the array substrate 10 and the counter substrate 20, the liquid crystal molecules may be aligned in a certain direction between the array substrate 10 and the counter substrate 20, thereby transmitting or blocking light.

Figure 8:
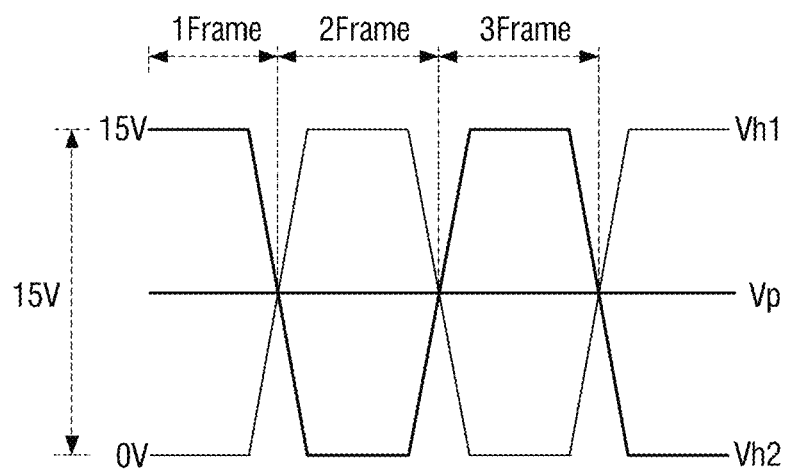
FIG. 8 is a waveform diagram illustrating a voltage change in a pixel region according to a voltage applied in each frame.

FIG. 8 is a waveform diagram illustrating a voltage change in a pixel region according to a voltage applied in each frame.

Referring to FIG. 8, the first reference voltage Vh1 applied to the first reference voltage line LVh1 may have a value of approximately 15 V during a first frame, a value of approximately 0 V during a second frame, and a value of approximately 15 V during a third frame. In addition, the second reference voltage Vh2 applied to the second reference voltage line LVh2 may have a value of approximately 0 V during the first frame, a value of approximately 15 V during the second frame, and a value of approximately 0 V during the third frame.

Even when the different polarities of the first reference voltage Vh1 and the second reference voltage Vh2 are changed every frame as described above, since the pixel electrodes PE1 and PE2 overlaps both the first reference voltage line LVh1 and the second reference voltage line Lvh2, changes in storage capacitance due to a change in the polarities of the first reference voltage Vh1 and the second reference voltage Vh2 are offset by each other. More specifically, in the LCD according to the exemplary embodiment of FIG. 1, the first subpixel electrode PE1 overlaps both the first reference voltage line LVh1 and the second reference voltage line LVh2, and the second subpixel electrode PE2 overlaps none of the first reference voltage line LVh1 and the second reference voltage line LVh2. Therefore, a change in storage capacitance between the first subpixel electrode PE1 and the first reference voltage line LVh1 and a change in storage capacitance between the first subpixel electrode PE1 and the second reference voltage line LVh2 according to a change in the polarities of the first reference voltage Vh1 and the second reference voltage Vh2 are offset by each other. Accordingly, even when the polarities of the first reference voltage Vh1 and the second reference voltage Vh2 are changed every frame, a pixel voltage Vp may not be changed.

Figure 9:
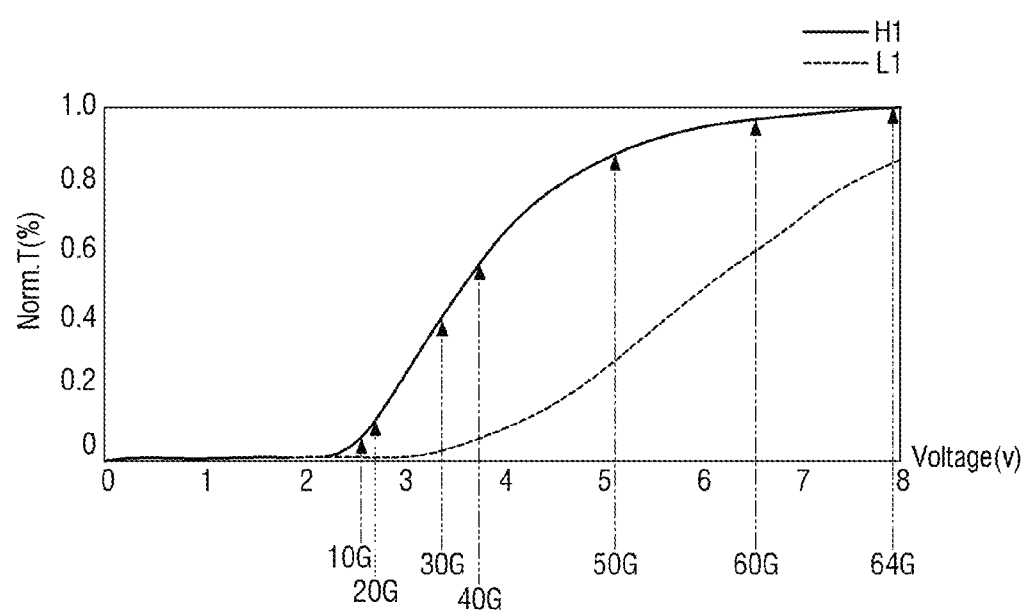
FIGS. 9 and 10 are graphs illustrating the change in transmittance with respect to the pixel voltage of an experimental example of an LCD according to the invention.
Figure 10:
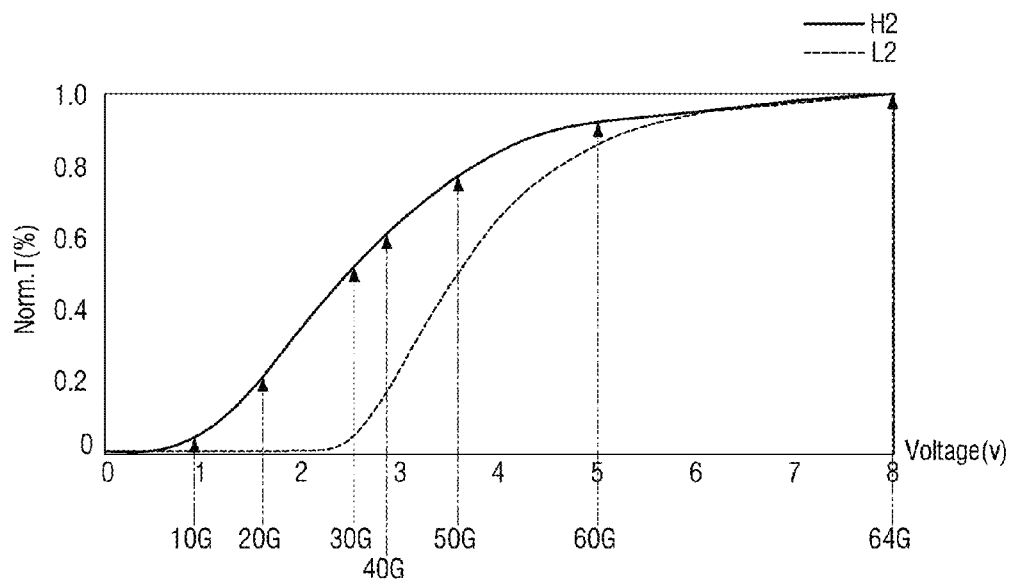

A change in transmittance with respect to a pixel voltage of an LCD according to an experimental example of the invention will now be described with reference to FIGS. 9 and 10. FIGS. 9 and 10 are graphs illustrating the change in transmittance (e.g., normalized transmittance nor.T) with respect to the pixel voltage of an LCD according to an experimental example of the invention.

In the illustrated experimental example, as in a conventional LCD, a pixel electrode is divided into a first subpixel electrode and a second subpixel electrode, and then a data voltage applied to the first subpixel electrode is divided such that a voltage of the first subpixel electrode is adjusted to be lower than the applied data voltage. In this case, a change H1 in transmittance according to the data voltage applied to the second subpixel electrode and a change L1 in transmittance according to the data voltage applied to the first subpixel electrode are illustrated in FIG. 9. In addition, as in the LCD according to the exemplary embodiment of FIG. 1, a pixel electrode is divided into a first subpixel electrode and a second subpixel electrode, and then a voltage of the second subpixel electrode is adjusted to be higher than an applied data voltage. In this case, the a change H2 in transmittance according to the data voltage applied to the second subpixel electrode and a change L2 in transmittance according to the data voltage applied to the first subpixel electrode are illustrated in FIG. 10.

Referring to FIG. 9, of the first subpixel electrode and the second subpixel electrode to which the same data voltage is applied through a data line, the voltage of the first subpixel electrode is reduced by a certain value. Therefore, when the applied data voltage has a relatively low value, e.g., approximately 4 V or less, overall transmittance may depend only on the transmittance H1 of the second subpixel electrode. The transmittance H1 of the second subpixel electrode shows virtually no change in a low gray-level region ranging from, e.g., 0 to approximately 20 G. Therefore, it is impossible to express gray levels in this gray-level region. In addition, in a gray-level region ranging from approximately 20 G to 40 G, an increase in transmittance according to the applied data voltage increases. This abrupt increase in transmittance may cause the screen to appear white. That is, in the low-gray level region, it is difficult to express gray levels according to the data voltage. In a high gray-level region, for example, when the data voltage is approximately 6.7 V or more, transmittance is reduced according to the voltage of the first subpixel electrode. Therefore, the overall transmittance of the LCD is low compared with the applied data voltage. That is, the transmittance efficiency of the LCD is low compared with a driving voltage.

Referring to FIG. 10, of the first subpixel electrode and the second subpixel electrode to which the same data voltage is applied through a data line, the voltage of the second subpixel electrode is increased by a certain value. Therefore, since a change in transmittance according to the applied data voltage is apparent in a low gray-level region, gray levels may be expressed even in the low gray-level region. In addition, an increase in transmittance according to the applied data voltage is almost constant even in the low gray-level region. Therefore, it is possible to prevent the screen from appearing white due to an abrupt increase in transmittance at particular gray levels. In a high gray-level region, for example, when the data voltage is approximately 6.7 V or more, transmittance is not reduced. Therefore, the overall transmittance of the LCD is increased. Accordingly, this increases the driving efficiency of the LCD.

As described above, in an LCD according to an exemplary embodiment of the invention, lateral visibility may be made close to front visibility, and gray levels may be accurately expressed in a low gray-level region. In addition, it is possible to prevent a reduction in luminance compared with an applied driving voltage. Further, a first reference voltage line and a second reference voltage line which deliver a first reference voltage and a second reference voltage of different polarities may prevent a change in the magnitude of a pixel voltage.

Figure 11A:
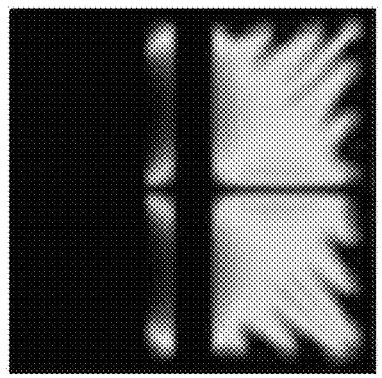
FIGS. 11A through 15B show images to compare the transmittance of a comparative example of an LCD and the transmittance of an exemplary embodiment of an LCD according to the invention.
Figure 15A:
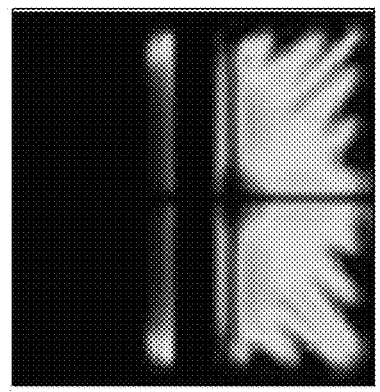
Figure 15B:
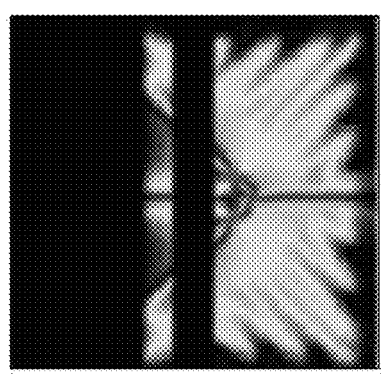

FIGS. 11A through 15B show images to compare the transmittance of an LCD according to a comparative example and the transmittance of an LCD according to an exemplary embodiment of the invention. More specifically, FIGS. 11A and 11B show images to compare the transmittances of the LCDs in a case where a common electrode and a pixel electrode are accurately aligned. FIGS. 12A and 12B show images to compare the transmittances of the LCDs in a case where the common electrode has been shifted to the left by 4 micrometers (μm) from the accurate alignment of FIGS. 11A and 11B. FIGS. 13A and 13B show images to compare the transmittances of the LCDs in a case where the common electrode has been shifted to the left by 8 μm from the accurate alignment of FIGS. 11A and 11B. FIGS. 14A and 14B show images to compare the transmittances of the LCDs in a case where the common electrode has been shifted to the right by 4 μm from the accurate alignment of FIGS. 11A and 11B. FIGS. 15A and 15B show images to compare the transmittances of the LCDs in a case where the common electrode has been shifted to the right by 8 μm from the accurate alignment of FIGS. 11A and 11B. In addition, FIGS. 11A, 12A, 13A, 14A and 15A show images to describe the transmittance of the LCD according to the comparative example in which a third opening part is implemented as part of a cross shape, and FIGS. 11B, 12B, 13B, 14B and 15B show images to describe the transmittance of the LCD according to the exemplary embodiment of the invention.

Figure 11B:
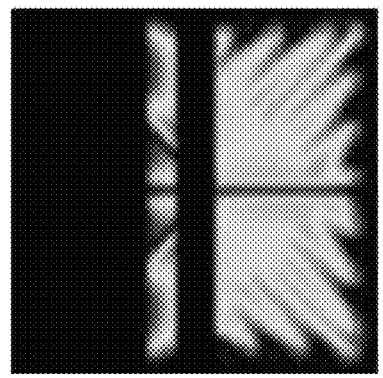
Figure 12A:
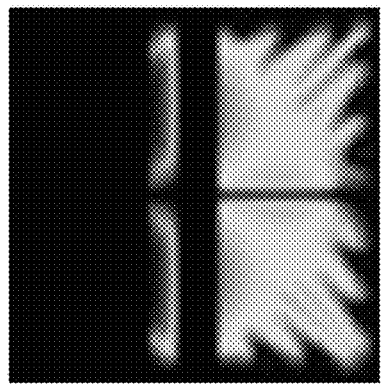
Figure 12B:
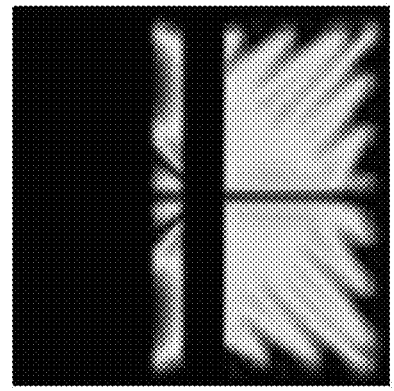
Figure 13A:
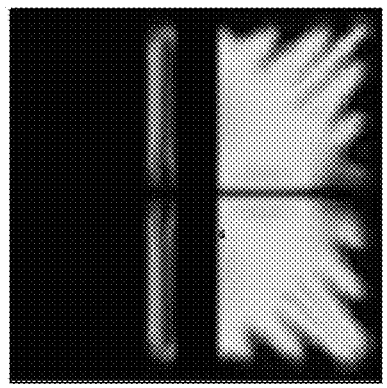
Figure 13B:
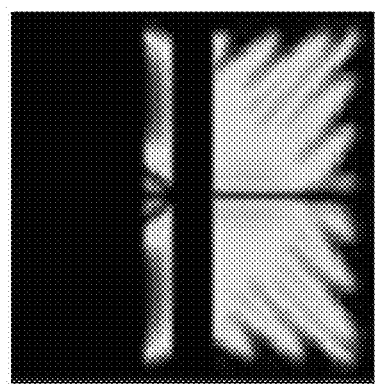
Figure 14A:
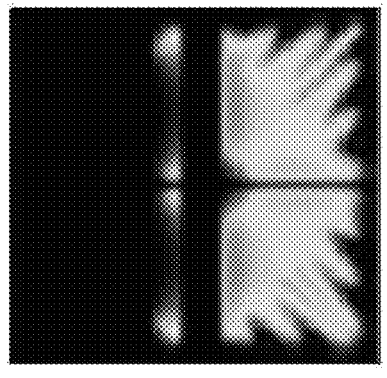
Figure 14B:
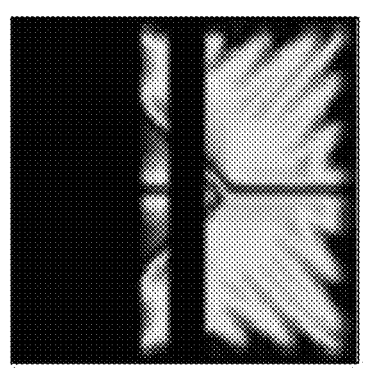

Referring to FIGS. 11A through 15B, when the common electrode and the pixel electrode were accurately aligned with each other as in FIGS. 11A and 11B, the transmittance of the LCD according to the comparative example was 100.3%, and the transmittance of the LCD according to the exemplary embodiment of the invention was 106.4%. When the common electrode was shifted to the left by 4 μm from the accurate alignment of FIGS. 11A and 11B, the transmittance of the LCD according to the comparative example was 101.9%, and the transmittance of the LCD according to the exemplary embodiment of the invention was 108.2% as illustrated in FIGS. 12A and 12B. When the common electrode was shifted to the left by 8 μm from the accurate alignment of FIGS. 11A and 11B, the transmittance of the LCD according to the comparative example was 100.3%, and the transmittance of the LCD according to the exemplary embodiment of the invention was 106.4% as illustrated in FIGS. 13A and 13B. When the common electrode was shifted to the right by 4 μm from the accurate alignment of FIGS. 11A and 11B, the transmittance of the LCD according to the comparative example was 97.8%, and the transmittance of the LCD according to the exemplary embodiment of the invention was 107.2% as illustrated in FIGS. 14A and 14B. When the common electrode was shifted to the right by 8 μm from the accurate alignment of FIGS. 11A and 11B, the transmittance of the LCD according to the comparative example was 89.82%, and the transmittance of the LCD according to the exemplary embodiment of the invention was 102.9% as illustrated in FIGS. 15A and 15B.

That is, a change in the shape of the third opening part may improve the transmittance of the LCD according to the exemplary embodiment of the invention. In addition, in the LCD according to the exemplary embodiment of the invention, a loss of transmittance and a change in transmittance may be reduced by a slight change in the horizontal alignment of the common electrode and the pixel electrode. That is, in the LCD according to the exemplary embodiment of the invention, it is possible to prevent a reduction in display quality due to an overlay variation between the common electrode and the pixel electrode.

Exemplary embodiments of the invention provide at least one of the following advantages.

That is, an LCD having improved visibility and transmittance may be provided.

In addition, an LCD having increased degree of freedom in design may be provided.

However, the effects of the invention are not restricted to the one set forth herein. The above and other effects of the invention will become more apparent to one of daily skill in the art to which the invention pertains by referencing the claims.

What is claimed is:

1. A liquid crystal display comprising:
   a first substrate;
   a gate line which is located on the first substrate and extends in a first direction;
   a data line which is located on the first substrate, extends in a second direction wherein the second direction intersects the first direction, and wherein the data line is insulated from the gate line;
   a reference voltage line which is located on the first substrate;
   a pixel electrode which is located in one pixel region and comprises a first subpixel electrode and a second subpixel electrode;
   a first switching device which is connected to the gate line, the data line and the first subpixel electrode;
   a second switching device which is connected to the gate line, the data line and the second subpixel electrode;
   a third switching device which is connected to the gate line, the reference voltage line and the second subpixel electrode;
   a second substrate which faces the first substrate;
   a common electrode which is located on a surface of the second substrate which faces the first substrate; and
   a liquid crystal layer which is located between the pixel electrode and the common electrode,
   wherein the first subpixel electrode comprises a first main unit electrode and a first sub unit electrode, wherein the first sub unit electrode is electrically connected to the first main unit electrode, and wherein the first sub unit electrode is smaller in area than the first main unit electrode,
   the second subpixel electrode comprises a second main unit electrode, and
   a first opening part overlaps the first main unit electrode, a second opening part overlaps the second main unit electrode, and a third opening part overlaps the first sub unit electrode and the third opening part has a different shape from those of the first opening part and the second opening part are defined in the common electrode.

2. The liquid crystal display of claim 1, wherein a data voltage applied to the data line and a reference voltage applied to the reference voltage line have the same polarity with respect to a common voltage applied to the common electrode.

3. The liquid crystal display of claim 2, wherein the reference voltage has a predetermined magnitude, and the polarity of the reference voltage with respect to the common voltage is changed every frame.

4. The liquid crystal display of claim 2, wherein a voltage applied to the second subpixel electrode is greater than a voltage applied to the first subpixel electrode.

5. The liquid crystal display of claim 1, wherein the first main unit electrode has the same shape as that of the second main unit electrode, and the first opening part has the same shape as that of the second opening part.

6. The liquid crystal display of claim 1, wherein a planar shape of each of the first opening part and the second opening part is a cross shape, and a planar shape of the third opening part is a Y shape.

7. The liquid crystal display of claim 1, wherein the first sub unit electrode is located on an edge of the first subpixel electrode.

8. The liquid crystal display of claim 1, wherein the first main unit electrode comprises a first main plate part which overlaps the first opening part and a plurality of first main branch electrodes which extend from the first main plate part, the second main unit electrode comprises a second main plate part which overlaps the second opening part and a plurality of second main branch electrodes which extend from the second main plate part, and the first sub unit electrode comprises a first sub plate part which overlaps the third opening part and a plurality of first sub branch electrodes which extend from the first sub plate part.

9. The liquid crystal display of claim 8, wherein at least one slit is defined in the first sub plate part.

10. The liquid crystal display of claim 1, wherein the third opening part comprises a sub opening which extends in a direction substantially parallel to an edge of the first sub plate part.

11. The liquid crystal display of claim 10, wherein notches are defined in the sub opening.

* * * * *